(12) United States Patent
Du

(10) Patent No.: US 10,440,269 B2
(45) Date of Patent: Oct. 8, 2019

(54) IMAGE CAPTURE CONTROL METHODS AND APPARATUSES

(71) Applicant: Beijing Zhigu Rui Tuo Tech Co., Ltd., Beijing (CN)

(72) Inventor: Lin Du, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 91 days.

(21) Appl. No.: 15/567,602

(22) PCT Filed: Apr. 22, 2016

(86) PCT No.: PCT/CN2016/079966
§ 371 (c)(1),
(2) Date: Oct. 18, 2017

(87) PCT Pub. No.: WO2016/169508
PCT Pub. Date: Oct. 27, 2016

(65) Prior Publication Data
US 2018/0295285 A1    Oct. 11, 2018

(30) Foreign Application Priority Data
Apr. 22, 2015 (CN) .......................... 2015 1 0194879

(51) Int. Cl.
*H04N 5/232* (2006.01)
*H04N 5/225* (2006.01)
*H04N 5/235* (2006.01)

(52) U.S. Cl.
CPC ....... *H04N 5/23245* (2013.01); *H04N 5/2254* (2013.01); *H04N 5/2257* (2013.01);
(Continued)

(58) Field of Classification Search
CPC .... H04N 5/2254; H04N 5/2257; H04N 5/232; H04N 5/23212; H04N 5/23245; H04N 5/23296; H04N 5/2353
See application file for complete search history.

(56) References Cited

U.S. PATENT DOCUMENTS

| | | | | |
|---|---|---|---|---|
| 9,100,557 B2* | 8/2015 | Ng | ........................ | G02B 3/0056 |
| 2002/0180877 A1* | 12/2002 | Kikuchi | ................. | H04N 5/335 |
| | | | | 348/315 |

(Continued)

FOREIGN PATENT DOCUMENTS

| CN | 102332090 A | 1/2012 |
|---|---|---|
| CN | 104104870 A | 10/2014 |

(Continued)

OTHER PUBLICATIONS

International Search Report for PCT Application No. PCT/CN2016/079966, dated Jul. 13, 2016, 4 pages.

(Continued)

*Primary Examiner* — Amy R Hsu
(74) *Attorney, Agent, or Firm* — Amin, Turocy & Watson, LLP

(57) ABSTRACT

Image capture control methods and apparatuses are provided. A method comprises: adjusting pixel distribution of an image sensing unit, to change a ratio of pixels distributed along two directions in an effective region of the image sensing unit, wherein light through a lens that is in an imaging system and corresponds to an image sensing unit is imaged on the image sensing unit in the effective region, the two directions are parallel with the image sensing unit and orthogonal to each other, the image sensing unit comprises pixels adjustable in distribution, and the pixels are used for recording multidirectional view information of a same object of a scene; and capturing an image of the scene by using the imaging system. Proportions of parallax informa- (Continued)

tion recorded by the image sensing unit in the two directions can be changed, and differential capture of view information in different directions can be implemented.

24 Claims, 10 Drawing Sheets

(52) U.S. Cl.
CPC ........... *H04N 5/232* (2013.01); *H04N 5/2353* (2013.01); *H04N 5/23212* (2013.01); *H04N 5/23296* (2013.01)

(56) References Cited

U.S. PATENT DOCUMENTS

| | | | | |
|---|---|---|---|---|
| 2007/0058179 | A1* | 3/2007 | Kuroki | G06T 3/4007 358/1.2 |
| 2009/0102753 | A1 | 4/2009 | Yamashita et al. | |
| 2010/0277609 | A1* | 11/2010 | Abe | H04N 5/232 348/222.1 |
| 2010/0277627 | A1* | 11/2010 | Duparre | H01L 27/14603 348/262 |
| 2012/0019676 | A1 | 1/2012 | Foote | |
| 2013/0128087 | A1* | 5/2013 | Georgiev | H04N 5/2254 348/307 |
| 2013/0155295 | A1* | 6/2013 | Bekiares | H04N 5/23206 348/240.99 |
| 2014/0168371 | A1* | 6/2014 | Chang | H04N 13/232 348/46 |
| 2015/0326791 | A1* | 11/2015 | Stahl | H04N 5/2628 348/240.99 |
| 2016/0011409 | A1* | 1/2016 | Oshima | H04N 5/23212 348/80 |
| 2016/0323524 | A1* | 11/2016 | Smith | H04N 5/23245 |

FOREIGN PATENT DOCUMENTS

| | | |
|---|---|---|
| CN | 104159025 A | 11/2014 |
| CN | 104243823 A | 12/2014 |
| CN | 104410784 A | 3/2015 |
| CN | 104469147 A | 3/2015 |
| JP | 2012026925 A | 2/2012 |

OTHER PUBLICATIONS

"Adobe LightField Camera Protypes", published online at [http://lighffield-forum.com/light-field-camera-prototypes/adobe-lighffield-camera-protypes/], retrieved Sep. 26, 2017, 4 pages.

Chinese Office Action dated Jul. 30, 2018 for Chinese Application No. 201510194879.2, 13 pages (with translation).

* cited by examiner

IMAGE CAPTURE CONTROL METHODS AND APPARATUSES

RELATED APPLICATION

The present application is a U.S. National Stage filing under 35 U.S.C. § 371 of international patent cooperation treaty (PCT) application No. PCT/CN2016/079966, filed Apr. 22, 2016, and entitled "IMAGE CAPTURE CONTROL METHODS AND APPARATUSES", which claims the benefit of priority to Chinese Patent Application No. 201510194879.2, filed on Apr. 22, 2015, which applications are hereby incorporated into the present application by reference herein in their respective entireties.

TECHNICAL FIELD

The present application relates to the technical field of terminals, and, for example, to various image capture control methods and apparatuses.

BACKGROUND

Light field cameras support capture information of a scene by a single exposure. The captured information is such as space information and view information of the scene. The captured information may be used for calculation to generate diversified image effects such as digital refocusing, multiview, 3D reconstruction and the like, and the light field cameras have a broad application prospect.

At present, a light field camera mainly uses a micro lens array formed by arranging a plurality of lenses in square or hexagon, a region in which light through each lens in the micro lens array is imaged on an image sensing unit corresponding to the lens is round, and the quantities of pixels distributed along all directions in the round region are the same.

SUMMARY

The following briefly describes the present application, so as to provide a basic understanding of some aspects of the present application. It should be understood that, the brief description is not an exhaustive description of the present application. The description is neither intended to determine key or important parts of the present application, nor intended to limit the scope of the present application. An objective thereof is merely to give some concepts in a simplified manner as a preface for more detailed description hereinafter.

One or more embodiments of the present application provide various image capture control methods and apparatuses.

According to a first aspect, an example embodiment of the present application provides an image capture control method, comprising:

adjusting pixel distribution of at least one image sensing unit, to change a ratio of pixels distributed along two directions in a respective effective region of the at least one image sensing unit, wherein the effective region is a region in which light through a lens that is in an imaging system and corresponds to an image sensing unit is imaged on the image sensing unit; the two directions comprise a first direction and a second direction that are parallel with the image sensing unit and orthogonal to each other; and the image sensing unit comprises a plurality of pixels adjustable in distribution, and the plurality of pixels is used for recording multidirectional view information of a same object of a scene; and capturing an image of the scene by using the imaging system.

According to a second aspect, an example embodiment of the present application further provides an image capture control apparatus, comprising:

a pixel distribution adjusting module, configured to adjust pixel distribution of at least one image sensing unit, to change a ratio of pixels distributed along two directions in a respective effective region of the at least one image sensing unit, wherein the effective region is a region in which light through a lens that is in an imaging system and corresponds to an image sensing unit is imaged on the image sensing unit; the two directions comprise a first direction and a second direction that are parallel with the image sensing unit and orthogonal to each other; and the image sensing unit comprises a plurality of pixels adjustable in distribution, and the plurality of pixels is used for recording multidirectional view information of a same object of a scene; and an image capture module, configured to capture an image of the scene by using the imaging system.

According to example embodiments of the present application, a characteristic of an image sensing unit in adjustable pixel distribution is fully used, and by adjusting the pixel distribution of the image sensing unit, in an effective region of the image sensing unit, pixels distributed along a first direction and a second directions are different in interval, that is, the pixel distribution of the image sensing unit is adjusted to cause quantities of the pixels distributed along the first direction and the second direction to be different, and the pixel ratio is not equal to 1; in this way, when an imaging system with the image sensing unit subject to pixel distribution adjustment captures an image of a scene, proportions of parallax information actually recorded by the image sensing unit in a first direction and a second direction can be changed, and differential capture of view information in different directions can be implemented.

The following describes in detail possible embodiments of the present application with reference to accompanying drawings, to make these and other advantages of the present application more obvious.

BRIEF DESCRIPTION OF THE DRAWINGS

The present application may be understood better with reference to the following description in combination with accompanying drawings, wherein same or similar marks are used in all the accompanying drawings to represent same or similar components. The accompanying drawings together with the following detailed description are comprised in the specification and constitute a part of the specification, and are used to further illustrate possible embodiments of the present application and explain the principle and advantages of the present application. In the accompanying drawings.

A person skilled in the art should understand that, elements in the accompanying drawings are merely shown for simplicity and clarity, and are not necessarily drawn to scale. For example, in the accompanying drawings, the size of an element may be enlarged relative to another element, so as to facilitate enhancement of an understanding of the embodiments of the present application.

DETAILED DESCRIPTION

The following will describe in details illustrative embodiments of the present application with reference to accompanying drawings. For the purpose of clear and brief description, the specification does not describe all features of practical implementation manners. However, it should be understood that, many decisions specific to the implementation manners must be made during development of any one of the practical embodiments, so as to achieve a specific objective of a developer, for example, conformance to restrictive conditions related with a system and service, wherein the restrictive conditions may vary with different implementation manners. In addition, it should also be understood that, although development work may be very complex and time-consuming, for a person skilled in the art that benefits from the content of the present disclosure, the development work is only a routine task.

Another point that should be noted here is, to avoid the present application from being not clearly understood due to unnecessary details, the accompanying drawings and specification merely describe apparatus structures and/or processing steps closely related to the solutions of the present application, but omit the representation and description of parts and processing that have little relation with the present application, and have been known by a person of ordinary skill in the art.

The following further describes in detail specific implementation manners of the present application with reference to the accompanying drawings (a same numeral represents a same element in several accompanying drawings) and embodiments. The following embodiments are used to describe the present application, but are not intended to limit the scope of the present application.

A person skilled in the art may understand that, terms such as "first" and "second" in the present application are merely used to distinguish different steps, devices or modules, which neither represent any specific technical meaning, nor represent a necessary logical sequence among them.

Figure 1:
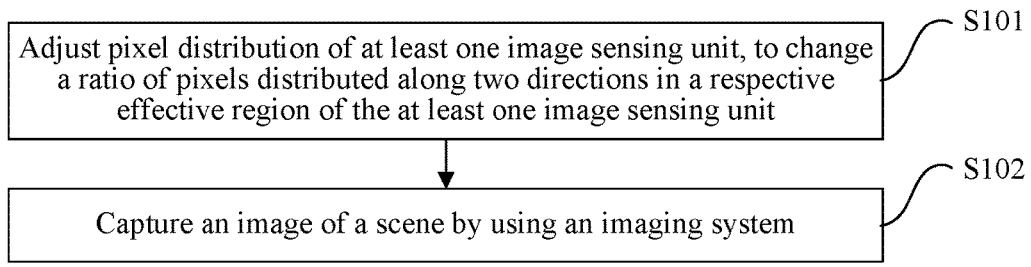
FIG. 1 is a flowchart of an image capture control method according to an example embodiment of the present application.

FIG. 1 is a flowchart of an image capture control method according to an embodiment of the present application. The image capture control method provided in this embodiment of the present application may be executed by an image capture control apparatus. There is no limitation to the manners in which the image capture control apparatus is embodied. For example, the image capture control apparatus may be an independent part; or the image capture control apparatus may be a functional module integrated in an imaging device, wherein the imaging device may comprise but is not limited to an electronic device such as a camera, a video camera, a mobile phone or a tablet computer having a camera shooting or photographing function, which is not limited in this embodiment of the present application. Specifically, as shown in FIG. 1, the image capture control method provided in this embodiment of the present application comprises:

S101: Adjust pixel distribution of at least one image sensing unit, to change a ratio of pixels distributed along two directions in a respective effective region of the at least one image sensing unit, wherein the effective region is a region in which light through a lens that is in an imaging system and corresponds to an image sensing unit is imaged on the image sensing unit; the two directions comprise a first direction and a second direction that are parallel with the image sensing unit and orthogonal to each other; and the image sensing unit comprises a plurality of pixels adjustable in distribution, and the plurality of pixels is used for recording multidirectional view information of a same object of a scene.

S102: Capture an image of the scene by using the imaging system.

The image sensing unit according to this embodiment of the present application comprises a plurality of pixels and is adjustable in pixel distribution, for example, intervals between at least partial pixels can be adjusted by controlling the image sensing unit to be at least partially deformed, thereby changing the pixel distribution in the image sensing unit. For example, in a practical application process, an image sensor of the imaging system may be considered as a whole, the image sensor is divided into a plurality of imaging regions, each of which corresponds to one lens in the imaging system, then the imaging regions become the image sensing units according to this embodiment of the present application, the pixel distribution is adjustable, and light through the lens is imaged on the corresponding image sensing unit; or the image sensor of the imaging system comprises a plurality of relatively independent image sensing units distributed in array and adjustable in pixel distribution, and the image sensing unit and the lens in the imaging system are disposed corresponding to each other. The image sensing unit is adjustable in pixel distribution and a specific structure and form of the device are not limited.

For example, the image sensing unit may be a flexible image sensing unit, the flexible image sensing unit has been used in photographing devises, and in the present application, the flexible image sensing unit can be subject to telescopic deformation to some extent by actions such as external force, thereby changing the pixel distribution of the image sensing unit.

For another example, the image sensing unit may comprise a plurality of pixels distributed in array, at least two pixels are connected by an elastic part, or a controllable deformed material parts (such as a light-induced deformed material part, a magnetic deformed material part, or a piezoelectric deformed material part) and other deformable connecting parts, to form a whole imaging surface. The external force or external field can act on the deformable connecting part to control deformation of the corresponding connecting part, and achieve the objectives of adjusting the interval between the at least two pixels and changing the pixel distribution of the image sensing unit.

It should be understood that according to practical application requirements, the flexible image sensing units and the image sensing units distributed in array may be combined for use, and form the image sensing unit adjustable in pixel distribution. In a situation in which the image sensor is a whole, the image sensor and the image sensing units may have same or similar structures, and details are not further described.

In the imaging system, a region in which light through the lens (the light may come from but is not limited to an object or a real image or virtual image of an object in the scene) is imaged on the image sensing unit is generally round, pixels of the image sensing unit in the round region record the information such as multidirectional view information corresponding to the light, and pixels of the image sensing unit outside the round region do not actually record light information; therefore, a region in which light through a lens is imaged on a corresponding image sensing unit (such as the round region) is referred to as an effective region of the image sensing unit, and other regions except the effective region of the image sensing unit are ineffective regions.

Generally, the effective region of the image sensing unit is a round region, quantities of pixels of the image sensing unit distributed in different directions in the effective region are equal, a ratio of the quantities of the pixels distributed along the different directions in the effective region (that is, a pixel ratio) is 1, for example, quantities of pixels distributed in two directions (the first direction and second direction) perpendicular to and orthogonal to the normal line in the effective region are equal, and the pixel ratio is 1, the effective region provides pixel quantities of a same proportion for recording parallax information in the two directions, and proportions of the amount of information in the two directions in the view information captured into the effective region are equal.

However, in some situations, such as situations of multiview information image generation and 3D reconstruction, view information in different directions has different meanings and/or actions for practical application. For example, in a scene in which a multiview information image is generated by using image information captured by the imaging system, view information in a direction may be particularly focused, more different view images in this direction are desired to be generated, and focus on view information in a direction perpendicular to the above direction is less. For another example, in a scene in which 3D reconstruction is performed by using image information captured by the imaging system, as human eyes are more sensitive to horizontal direction views, it is expected to acquire more images of different parallaxes in horizontal direction to reconstruct a 3D scene, and human eyes are insensitive to perpendicular direction views. In a traditional manner for image capture, view information of a same proportion in different directions can be acquired, but in this capture manner, pixel resources of the image sensing unit are not fully used to meet requirements for differential proportions of view information in different directions.

According to this example embodiment of the present application, a characteristic of an image sensing unit in adjustable pixel distribution is fully used, and by adjusting the pixel distribution of the image sensing unit, in an effective region of the image sensing unit, pixels distributed along a first direction and a second directions are different in interval, that is, the pixel distribution of the image sensing unit is adjusted to cause quantities of the pixels distributed along the first direction and the second direction to be different, and the pixel ratio is not equal to 1; in this way, when an imaging system with the image sensing unit subject to pixel distribution adjustment captures an image of a scene, proportions of parallax information actually recorded by the image sensing unit in a first direction and a second direction can be changed, and differential capture of view information in different directions can be implemented.

Figure 2A:
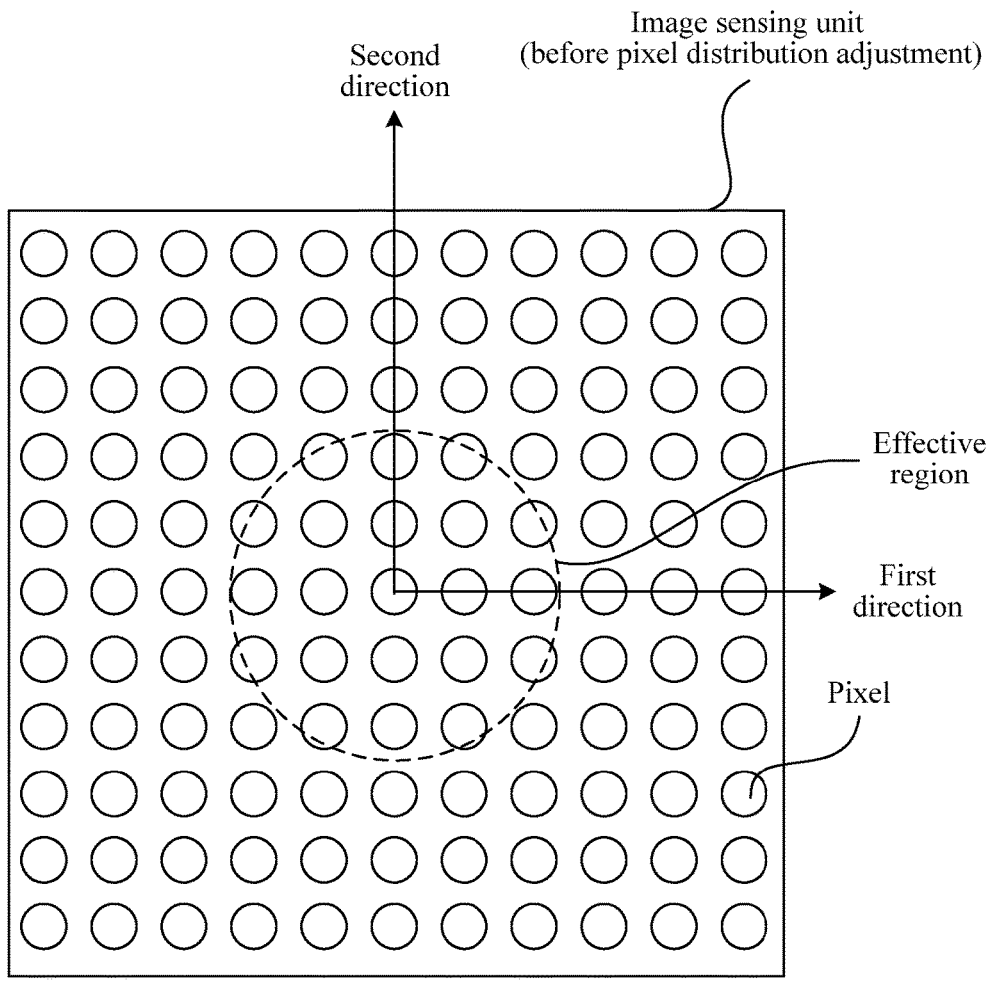
FIG. 2a is a first example of pixel distribution before adjustment of an image sensing unit according to an embodiment of the present application.

The region in which the light through the lens is imaged on the image sensing unit is round, that is, the shape of the effective region of the image sensing unit is round. As shown in FIG. 2a, before the pixel distribution of the image sensing unit is adjusted, the pixels of the image sensing unit are uniformly distributed and the ratio of the pixels distributed along the first direction and the second direction in the effective region is equal to 1.

Figure 2B:
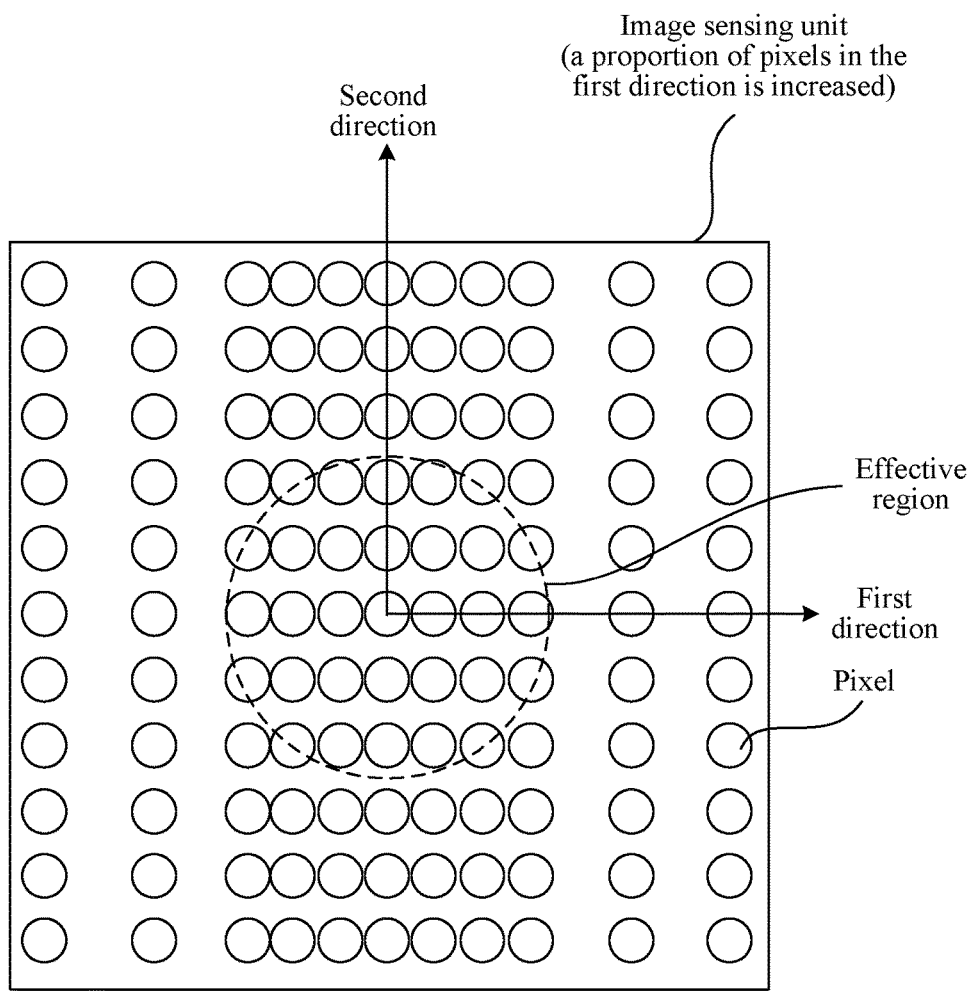
FIG. 2b is a first example of pixel distribution adjustment of an image sensing unit according to an embodiment of the present application.
Figure 2C:
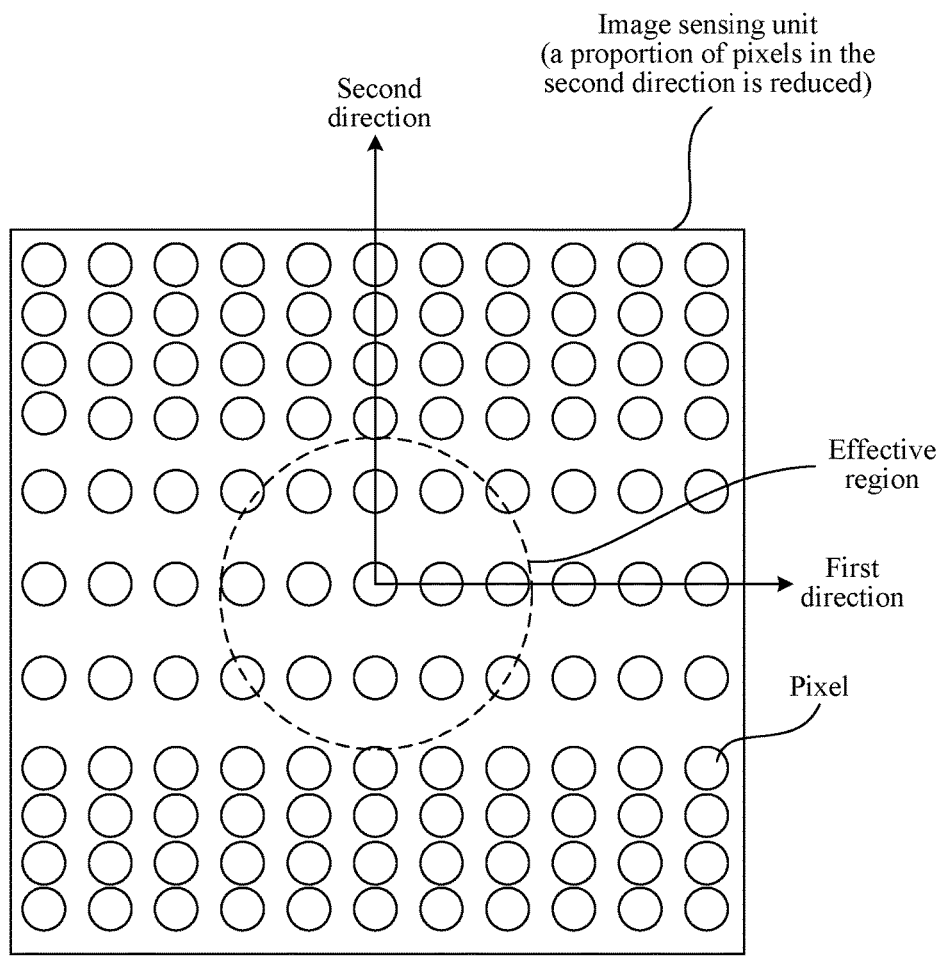
FIG. 2c is a second example of pixel distribution adjustment of an image sensing unit according to an embodiment of the present application.
Figure 2D:
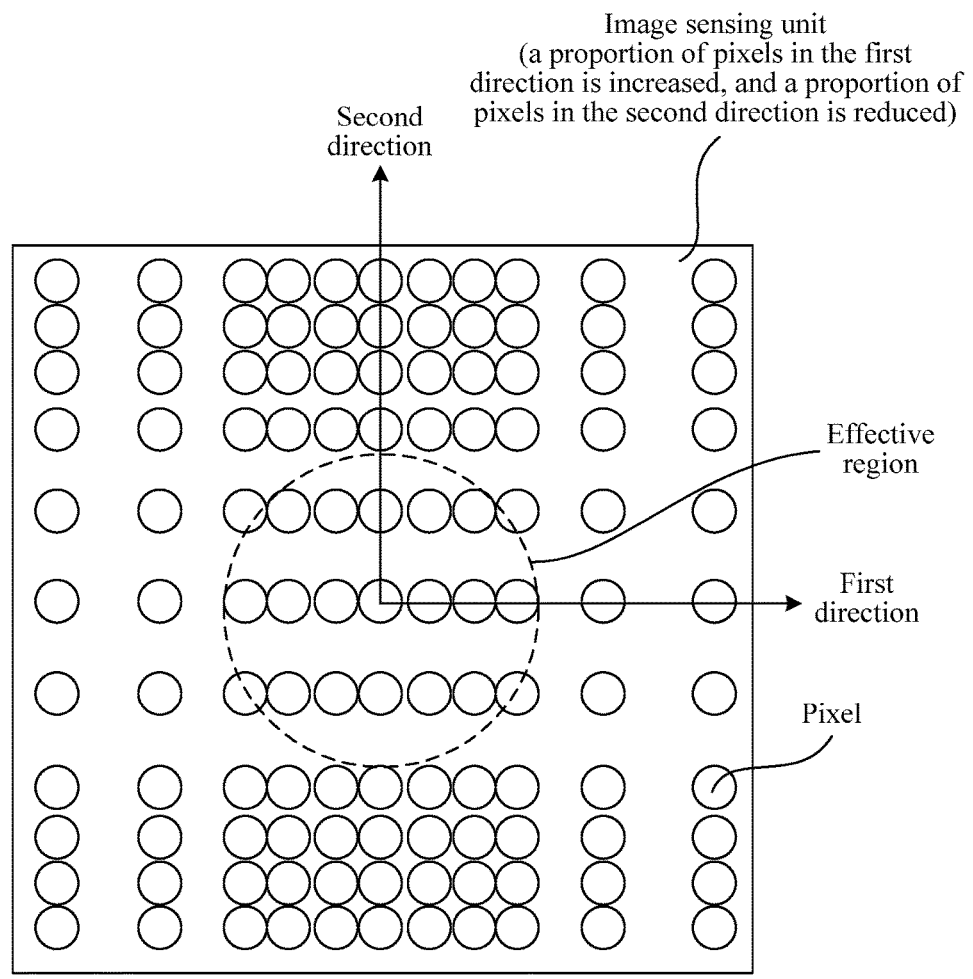
FIG. 2d is a third example of pixel distribution adjustment of an image sensing unit according to an embodiment of the present application.

After the pixel distribution of the image sensing unit is adjusted, as shown in FIG. 2b to FIG. 2d, the pixel distribution along different directions in the effective region of the image sensing unit is changed, and particularly, the quantity of the pixels distributed along the first direction and the quantity of the pixels distributed along the second direction in the effective region are different, causing the ratio of the pixels distributed along the two directions in the effective region to be not equal to 1; in this way, when the imaging system with the image sensing unit subject to pixel distribution adjustment captures an image, proportions of view information in the first direction and the second direction in the image captured by the image sensing unit is different and differential capture of view information in different directions can be implemented.

A pixel distribution characteristic of the effective region after the pixel distribution adjustment is related to a manner of adjustment of the pixel distribution of the image sensing unit, the pixel distribution of the image sensing unit may be flexibly adjusted, for example, the at least one image sensing unit is controlled to be deformed, to increase the quantity of the pixels distributed along the first direction and/or reduce the quantity of the pixels distributed along the second direction in the effective region of the image sensing unit, to cause the ratio of the pixels distributed in the two directions of the effective region after the pixel distribution adjustment to meet practical application requirements. For example, an interval between pixels distributed along a direction (such as the first direction or the second direction) in the effective region may be increased, to increase a quantity of the pixels distributed along the direction in the effective region; and/or an interval between pixels distributed along a direction (such as the first direction or the second direction) in the effective region may be reduced, to reduce a quantity of the pixels distributed along the direction in the effective region Pixel distribution characteristics of the effective region that are possibly generated after the pixel distribution of the image sensing unit is adjusted are described by using examples hereinafter.

In one possible situation, as shown in FIG. 2b, the image sensing unit is controlled to be deformed to reduce the interval between the pixels distributed along the first direction in the effective region, and thereby the quantity of the pixels distributed along the first direction in the effective region is increased while the quantity of the pixels distributed along the second direction is unchanged, and then the ratio of the pixels distributed along the two directions in the effective region is changed. In this situation, the amount of view information captured in the first direction can be increased, and differential capture of view information in the two directions is implemented. In addition, the image sensing unit comprises a plurality of pixels adjustable in distribution, and generally, the effective region comprises partial pixels of the image sensing unit, that is, pixels of the image sensing unit distributed outside the effective region do not actually record light information, causing that the pixels of the image sensing unit are not fully used, and in this situation, the quantity of the pixels distributed along the first direction in the shape-changed effective region can be increased, and a proportion of ineffective pixels of the image sensing unit is reduced, and thereby an actual use rate of the pixels of the image sensing unit is improved.

In another possible situation, as shown in FIG. 2c, the image sensing unit is controlled to be deformed to increase the interval between the pixels distributed along the second direction in the effective region, and thereby the quantity of the pixels distributed along the second direction in the effective region is reduced while the quantity of the pixels distributed along the first direction is unchanged, and then the ratio of the pixels distributed along the two directions in the effective region is changed. In this situation, the amount of view information captured in the second direction may be reduced, differential capture of view information in the two directions is implemented, and the output and processing data amount of the view information in the second direction is reduced. In scenes in which the view information in the second direction is less focused or required, a resource required for processing the view information in the second direction can be saved in this solution, and an actual use rate of a resource is improved.

In another possible situation, as shown in FIG. 2d, the image sensing unit is controlled to be deformed to reduce the interval between the pixels distributed along the first direction and increase the interval between the pixels distributed along the second direction in the effective region, and thereby the quantity of the pixels distributed along the first direction in the effective region is increased while the quantity of the pixels distributed along the second direction is reduced, and then the ratio of the pixels distributed along the two directions in the effective region is changed. In this situation, advantages of the two situations above can be combined and an actual use rate of a resource is improved.

A possible situation may also comprise: in the image sensing unit after pixel distribution adjustment, the quantities of the pixels along the two directions in the shape-changed effective region are both increased but increased by different quantities to change the ratio of the pixels distributed in the two directions, or a possible situation may comprise: in the image sensing unit after pixel distribution adjustment, the quantities of the pixels along the two directions in the shape-changed effective region are both reduced but reduced by different quantities to change the ratio of the pixels distributed in the two directions, and thereby differential capture of view information in the two directions is implemented by changing the pixel ratio.

In this example embodiment of the present application, the first direction and the second direction are flexibly determined under the premise of being perpendicular to the normal line and orthogonal to each other, which is not limited in present application. Optionally, the first direction is a horizontal direction perpendicular to the image sensing unit. Research shows that human eyes (left eye and right eye) are in horizontal distribution, which causes that human vision is more sensitive to horizontal direction view information and insensitive to vertical direction view information to some extent; therefore, in an image capture process, the view information in the horizontal direction and the vertical direction has different impact on human eye vision in scenes such as a 3D reconstruction scene, and the view information in the horizontal direction is more focused or required than the view information in the vertical direction. By determining the horizontal direction parallel with the image sensing unit as the first direction and the vertical direction parallel with the image sensing unit as the second direction, differential capture of view information in different directions by the image sensing unit can be implemented, a proportion of view information in the first direction (horizontal direction) is increased in image information captured by the image sensing unit, and/or a proportion of view information in the second direction (vertical direction) is reduced in the image information captured by the image sensing unit, and thereby an actual use ratio of a resource is improved and a practical application requirement on diversity is better met.

Figure 3:
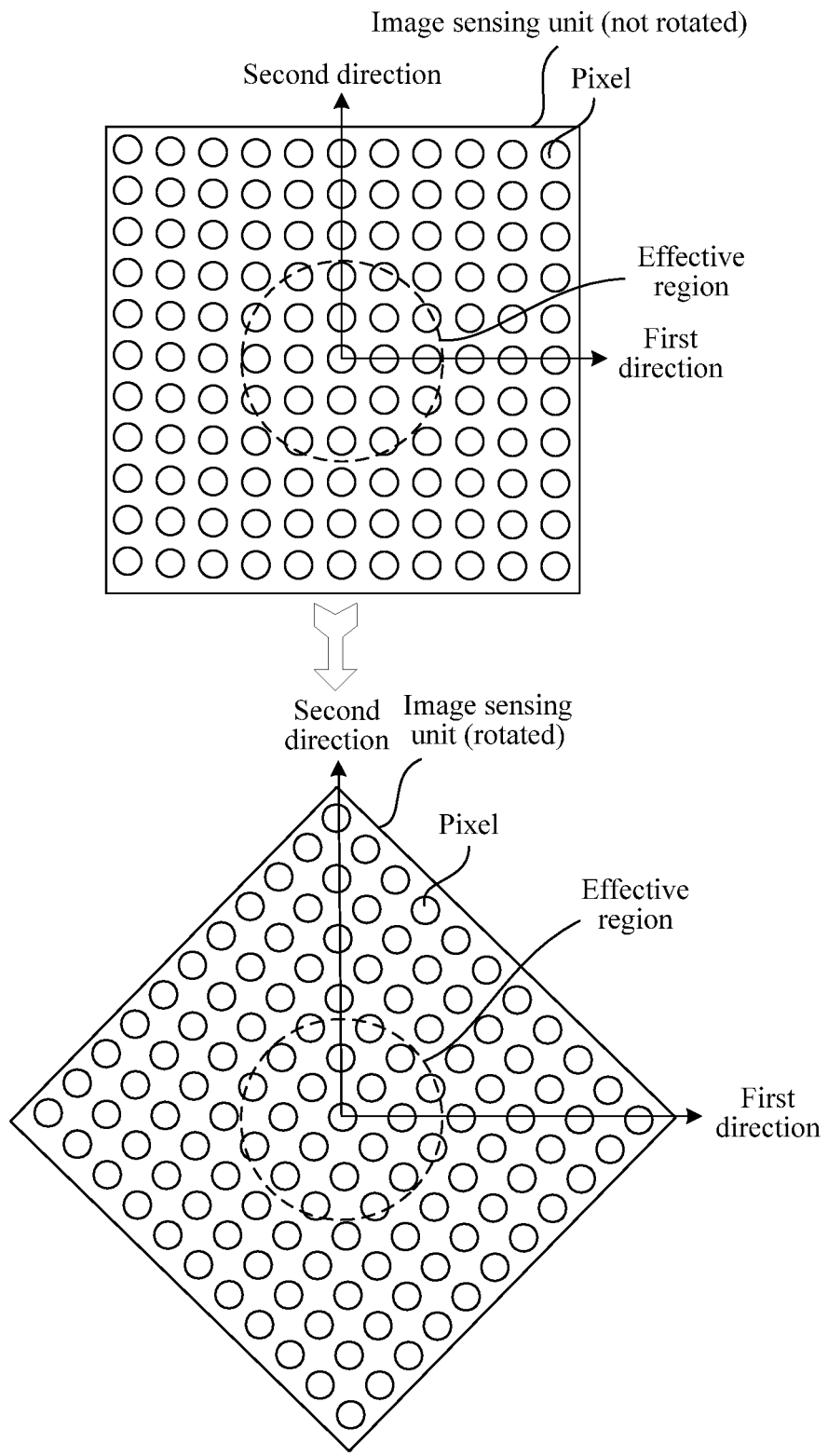
FIG. 3 is an example of rotation of an image sensing unit according to an embodiment of the present application.

According to this example embodiment of the present application, by adjusting the pixel distribution of the image sensing unit, the pixel distribution in the effective region of the image sensing unit can be changed, and an actually changed pixel quantity in the effective region is related to a pixel quantity and relative position of the image sensing unit. Optionally, before the capturing an image of the scene by using the imaging system, the method further comprises: rotating the at least one image sensing unit around a respective normal line, to increase the quantity of the pixels distributed along the first direction of the at least one image sensing unit. For example, as shown in FIG. 3, the image sensing unit may be rotated by 45 degrees around its normal line to cause that after the image sensing unit is rotated, the quantity of the pixels distributed along the first direction is increased as compared with that before the image sensing unit is rotated, which enlarges a range of changing the quantity of the pixels distributed along the first direction in the effective region by controlling the image sensing unit to be deformed, helps to adjust more pixels distributed along the first direction from the existing pixels of the image sensing unit into the effective region, further helps to increase the proportion of the view information in the first direction in the image information captured by the image sensing unit, implements differential capture of view information in different directions, and improves the actual use rate of the resource as far as possible. It should be noted that the operation of rotating the image sensing unit may be performed before or after the pixel distribution of the image sensing unit is adjusted, and the implementation manner is very flexible, which is not limited in this embodiment of the present application.

The imaging system in this example embodiment of the present application may be applied has a characteristic of recording view information of a same object in different directions in a scene by using a plurality of pixels.

Figure 4:
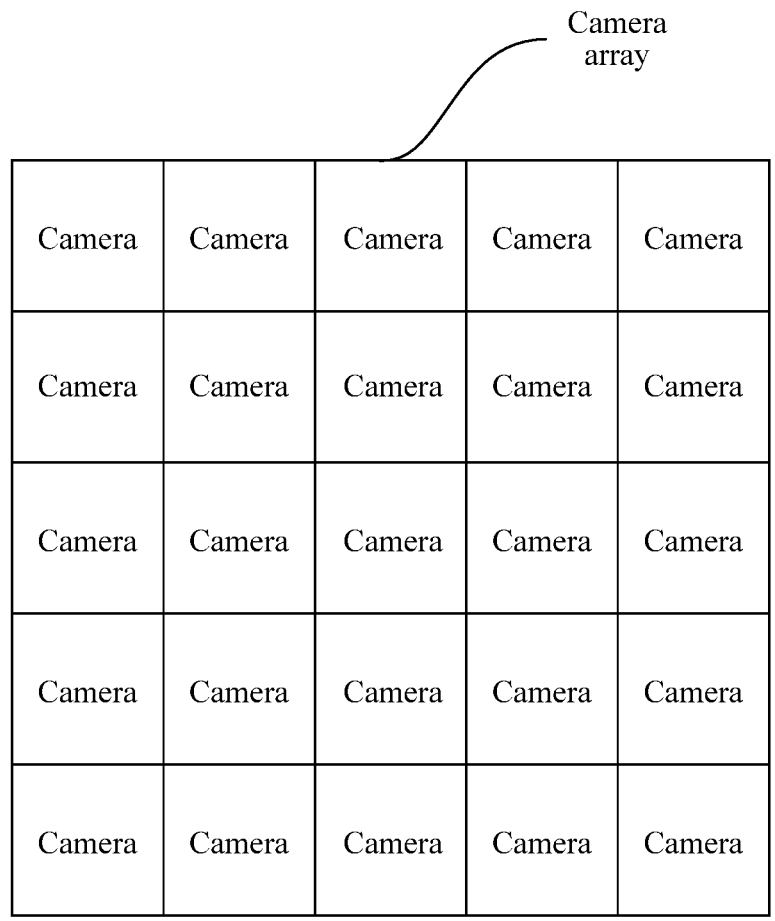
FIG. 4 is a schematic structural diagram of a camera array according to an example embodiment of the present application.

Optionally, the imaging system comprises a camera array, as shown in FIG. 4, the camera array comprises a plurality of cameras distributed in array, and the cameras comprise lenses and image sensing units disposed in sequence. An image sensing unit of each camera comprises a plurality of pixels distributed in array, used for recording view information of a same object in different directions in a scene. Objects in the scene and corresponding to image sensing units of different cameras may be different. In the camera array, image sensing units of one or more cameras may be inclined, to implement differential capture of view information of corresponding objects in different directions by corresponding image sensing units, and thereby a practical application requirement on diversity is met.

Figure 5:
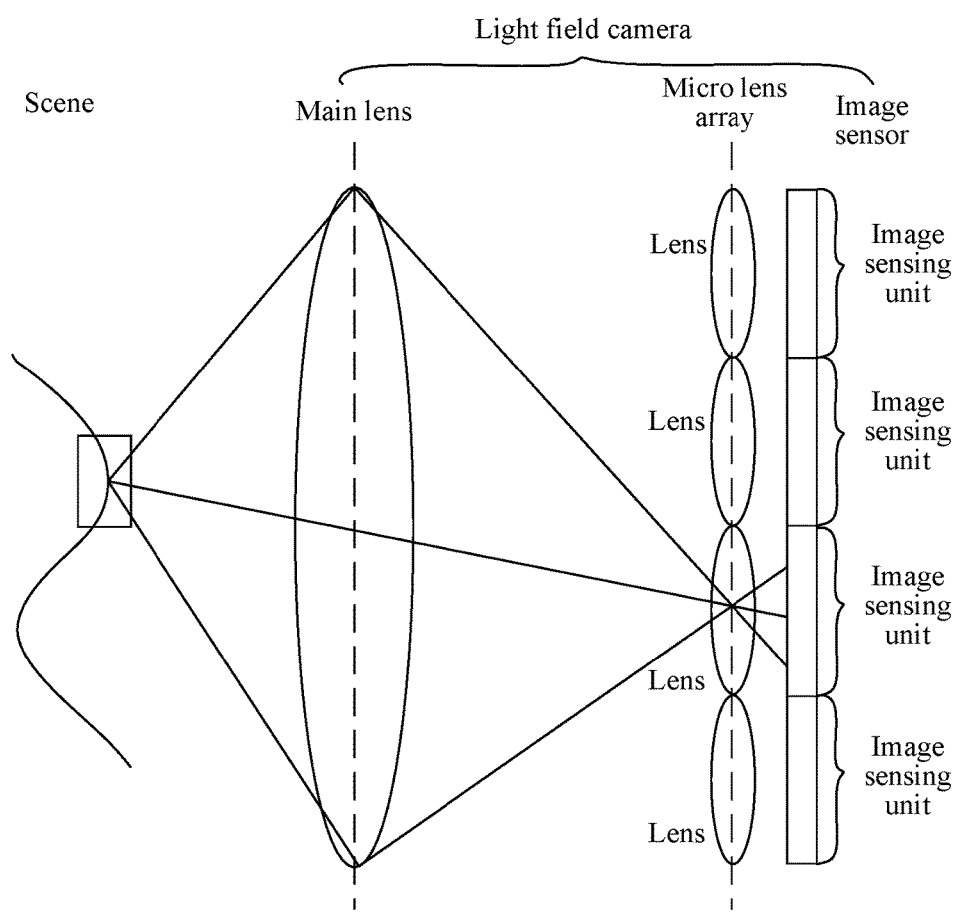
FIG. 5 is a schematic structural diagram of a light field camera according to an example embodiment of the present application.

Optionally, the imaging system may comprise a light field camera, as shown in FIG. 5, the light field camera comprises a main lens, a micro lens array and an image sensor disposed in sequence, the micro lens array comprises a plurality of lenses distributed in array, and the image sensor comprises a plurality of image sensing units distributed in array. The lenses in the micro lens array are disposed corresponding to the image sensing units in the image sensor, and each image sensing unit comprises a plurality of pixels distributed in array, used for recording view information of a same object in different directions in the scene. Objects in the scene and corresponding to different image sensing units may be different. In the light field camera, one or more image sensing units of the image sensor may be inclined, to implement differential capture of view information of corresponding objects in different directions by corresponding image sensing units, and thereby a practical application requirement on diversity is met.

With reference to any image capture control method provided in the embodiments of the present application, optionally, before the capturing an image of the scene by using the imaging system, the method further comprises: translating the image sensing unit along a respective normal line to enlarge the effective region in which the light through the corresponding lens is imaged on the image sensing unit. The movement of the image sensing unit along the normal line changes the size of the effective region in which the light through the lens corresponding to the image sensing unit is imaged on the image sensing unit, for example, the image sensing unit is moved along with the normal line to the direction in which the distance between the image sensing unit and the corresponding lens is increased, that is, the image sensing unit is moved along the normal line to the direction away from the lens, and the effective region in which the light through the lens is imaged on the image sensing unit is enlarged. Since in the solution, the image sensing unit is translated along the normal line to enlarge the effective region in which the light through the corresponding lens is imaged on the image sensing unit, to cause the maximal variable range of the ratio of the pixels distributed along the first direction and the second direction in the effective region to be accordingly increased, thereby the adjustment flexibility of the ratio of the pixels distributed in the two directions is increased, universality of the solution is increased, and the practical application requirement on diversity is met. It should be understood that the operation of translating the image sensing unit along the normal line may be performed before or after the operation of adjusting the pixel distribution of the image sensing unit and/or rotating the image sensing unit, and the implementation manner is very flexible. In addition, the focusing state when the imaging system performs image capture may be changed by the translation of the image sensing unit along the normal line, and in this situation, whether the focusing compensation is required is determined according to actual needs. For example, if the focusing compensation is required, manners comprising but not limited to the manner of adjusting the focus length of the lens may be used, to cause the adjusted focusing position to be close as far as possible to or overlapped with the focusing position before the adjustment, or cause the adjusted focusing position to fall into a refocusing range allowed before the imaging system is adjusted; in some situations, such as a situation in which the adjustment of the focusing position affects the image capture little or the adjusted focusing position still falls into the refocusing range allowed before the imaging system is adjusted and the like, the focusing compensation is not required.

Further, with reference to any image capture control method provided in the embodiments of the present application, optionally, before the adjusting pixel distribution of at least one image sensing unit, the method further comprises: determining the first direction. After the first direction is determined, according to a relationship between the first direction and the second direction, the second direction is determined, and differential capture of view information in the first direction and the second direction is implemented. In the solution, directions of differential capture of view information may be determined according to actual requirements, the implementation manner is flexible and the practical application requirement on diversity is met.

Figure 6A:
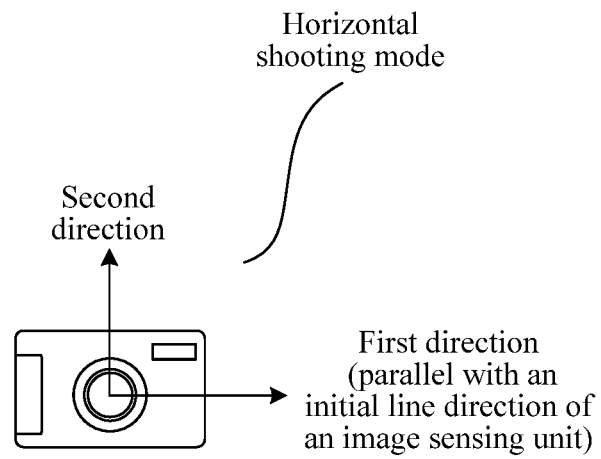
FIG. 6a is an example of a horizontal shooting mode according to an embodiment of the present application.
Figure 6B:
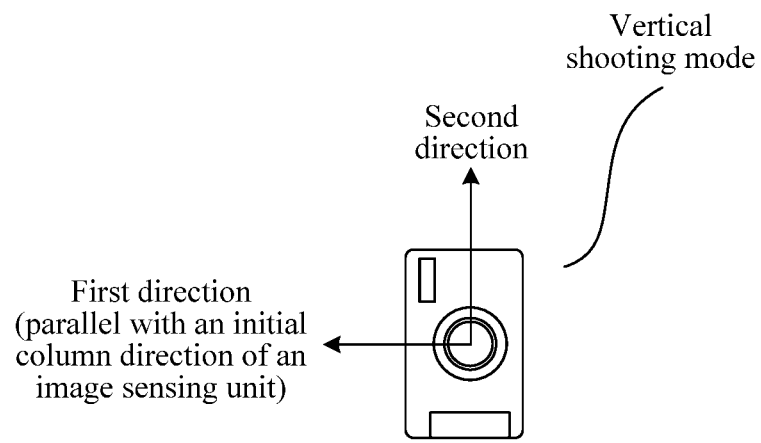
FIG. 6b is an example of a vertical shooting mode according to an embodiment of the present application.

Optionally, the determining the first direction comprises: determining the first direction according to an image capture mode of the imaging system. Scanning output manners of the image capture information corresponding to different image capture modes may vary, in order to facilitate the scanning output of the differential view information capture, the first direction may be determined at least according to the image capture mode of the imaging system. For example, the image capture modes may comprise but are not limited to a horizontal shooting mode and a vertical shooting mode, for example, the reverse direction of the image sensing unit corresponding to the horizontal direction relatively sensitive to human eyes when an image capture apparatus such as a camera is in the horizontal shooting mode is different from the reverse direction of the image sensing unit corresponding to the horizontal direction relatively sensitive to the human eyes when the camera is in the vertical shooting mode, and a reference direction corresponding to the image capture mode of the imaging system may be determined as the first direction according to a mapping relationship between the image capture mode and the reference direction. The solution causes the determination of the first direction to be adaptive to the image capture mode. As shown in FIG. 6a and FIG. 6b, it can be determined in advance that the reference direction corresponding to the horizontal shooting mode is parallel with the initial line direction of the image sensing unit (the initial line direction is the pixel line direction of the image sensing unit that is not rotated), and that the reference direction corresponding to the vertical shooting mode is parallel with the initial column direction of the image sensing unit (the initial line direction is the pixel column direction of the image sensing unit that is not rotated), and next, before the pixel distribution of image sensing unit is adjusted, according to the current image capture mode of the camera, the reference direction corresponding to the image capture mode is determined as the first direction. In the solution, the first direction is determined in combination with the position change of the image sensing unit in different image capture modes, to cause the determination of the first direction to have more pertinence, and differential capture of view information in two different directions such as the horizontal direction and vertical direction can be acquired.

Optionally, the determining the first direction comprises: determining the first direction according to an image analysis result of the scene. In natural world, object distribution of the scene presents a rule, for example, under the action of gravity, the scene (for example, a "mountain") may represent a distribution rule such as a large bottom and a small top, and the distribution rule helps to determine the horizontal direction and the vertical direction, and is used as the basis for determining the second direction, to implement differential capture of view information in two directions such as the horizontal direction and the vertical direction.

A person of ordinary skill in the art should understand that in any method of the embodiments of the present application, numbers of steps do not mean the execution sequence, the execution sequence of steps should be determined according to functions and internal logic without causing any limitation to the execution process of the embodiments of the present application in any form.

Figure 7:
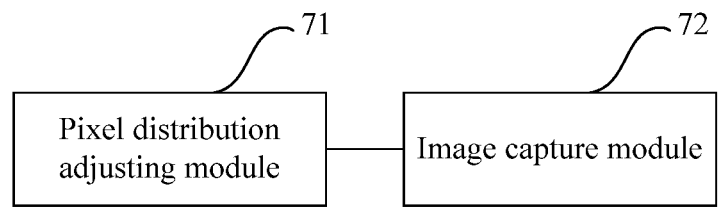
FIG. 7 is a logical block diagram of a first image capture control apparatus according to an example embodiment of the present application.

FIG. 7 is a logical block diagram of a first image capture control apparatus according to an embodiment of the present application. As shown in FIG. 7, the first image capture control apparatus provided in this embodiment of the present application comprises: a pixel distribution adjusting module 71 and an image capture module 72.

The pixel distribution adjusting module 71 is configured to adjust pixel distribution of at least one image sensing unit, to change a ratio of pixels distributed along two directions in a respective effective region of the at least one image sensing unit, wherein the effective region is a region in which light through a lens that is in an imaging system and corresponds to an image sensing unit is imaged on the image sensing unit; the two directions comprise a first direction and a second direction that are parallel with the image sensing unit and orthogonal to each other; and the image sensing unit comprises a plurality of pixels adjustable in distribution, and the plurality of pixels is used for recording multidirectional view information of a same object of a scene.

The image capture module 72 is configured to capture an image of the scene by using the imaging system.

The image sensing unit comprises a plurality of pixels and is adjustable in pixel distribution, for example, intervals between at least partial pixels can be adjusted by controlling the image sensing unit to be at least partially deformed, thereby changing the pixel distribution in the image sensing unit. For example, in a practical application process, an image sensor of the imaging system may be considered as a whole, the image sensor is divided into a plurality of imaging regions, each of which corresponds to one lens in the imaging system, then the imaging regions become the image sensing units according to this embodiment of the present application, the pixel distribution is adjustable, and light through the lens is imaged on the corresponding image sensing unit; or the image sensor of the imaging system comprises a plurality of relatively independent image sensing units distributed in array and adjustable in pixel distribution, and the image sensing unit and the lens in the imaging system are disposed corresponding to each other. The image sensing unit is adjustable in pixel distribution and a specific structure and form of the device are not limited.

For example, the image sensing unit may be a flexible image sensing unit, the flexible image sensing unit has been used in photographing devises, and in the present application, the flexible image sensing unit can be subject to telescopic deformation to some extent by actions such as external force, thereby changing the pixel distribution of the image sensing unit.

For another example, the image sensing unit may comprise a plurality of pixels distributed in array, at least two pixels are connected by an elastic part, or a controllable deformed material parts (such as a light-induced deformed material part, a magnetic deformed material part, or a piezoelectric deformed material part) and other deformable connecting parts, to form a whole imaging surface. The external force or external field can act on the deformable connecting part to control deformation of the corresponding connecting part, and achieve the objectives of adjusting the interval between the at least two pixels and changing the pixel distribution of the image sensing unit.

It should be understood that according to practical application requirements, the flexible image sensing units and the image sensing units distributed in array may be combined for use, and form the image sensing unit adjustable in pixel distribution. In a situation in which the image sensor is a whole, the image sensor and the image sensing units may have same or similar structures, and details are not further described.

According to this example embodiment of the present application, a characteristic of an image sensing unit in adjustable pixel distribution is fully used, and by adjusting the pixel distribution of the image sensing unit, in an effective region of the image sensing unit, pixels distributed along a first direction and a second directions are different in interval, that is, the pixel distribution of the image sensing unit is adjusted to cause quantities of the pixels distributed along the first direction and the second direction to be different, and the pixel ratio is not equal to 1; in this way, when an imaging system with the image sensing unit subject to pixel distribution adjustment captures an image of a scene, proportions of parallax information actually recorded by the image sensing unit in a first direction and a second direction can be changed, and differential capture of view information in different directions can be implemented.

There is no limitation to the manners in which the image capture control apparatus is embodied. For example, the image capture control apparatus may be an independent part; or the image capture control apparatus may be a functional module integrated in an imaging device, wherein the imaging device may comprise but is not limited to an electronic device such as a camera, a video camera, a mobile phone or a tablet computer having a camera shooting or photographing function, which is not limited in this embodiment of the present application.

The first direction and the second direction are flexibly determined under the premise of being parallel with the image sensing unit and orthogonal to each other, which is not limited in the present application. Optionally, the first direction is a horizontal direction parallel with the image sensing unit. In the solution, differential capture of view information in different directions by the image sensing unit can be implemented, a proportion of view information in the first direction (horizontal direction) is increased in image information captured by the image sensing unit, and/or a proportion of view information in the second direction (vertical direction) is reduced in the image information captured by the image sensing unit, and thereby, the actual use rate of the resource is improved, and the practical application requirement on diversity is met.

Figure 8:
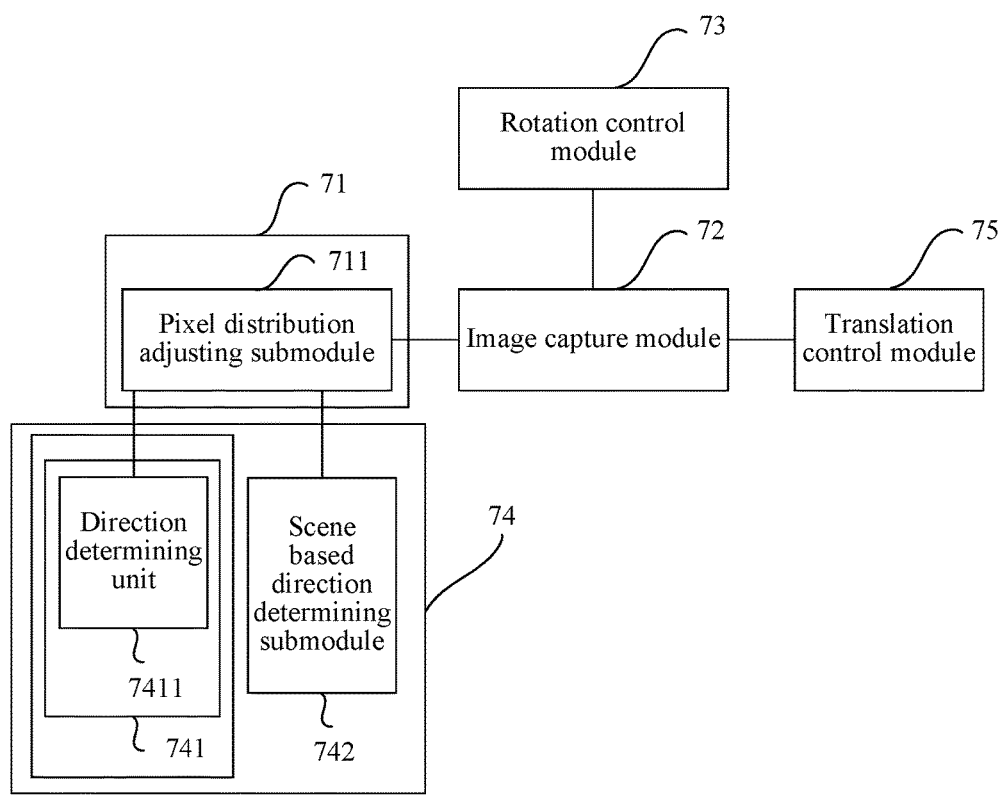
FIG. 8 is a logical block diagram of a second image capture control apparatus according to an example embodiment of the present application.

Optionally, as shown in FIG. 8, the pixel distribution adjusting module 71 comprises: a pixel distribution adjusting submodule 711. The pixel distribution adjusting submodule 711 is configured to control the at least one image sensing unit to be deformed, to increase a quantity of pixels distributed along the first direction and/or reduce a quantity of pixels distributed along the second direction in the effective region of the image sensing unit. In this solution, by controlling the interval between the pixels distributed along the first direction and/or the interval between the pixels distributed along the second direction of the image sensing unit, the proportion of the pixels distributed along the first direction and the second direction in the effective region in the image sensing unit subject to pixel distribution adjustment is changed, and thereby differential capture of view information in the first direction and the second direction is implemented, and the actual use rate of the resource is improved.

Optionally, the image capture control apparatus further comprises: a rotation control module 73. The rotation control module 73 is configured to rotate the at least one image sensing unit around a respective normal line, to increase the quantity of the pixels distributed along the first direction of the at least one image sensing unit. By using the solution, differential capture of view information in different directions can be implemented, and the actual use rate of the resource is improved as far as possible.

Optionally, as shown in FIG. 4, the imaging system comprises a camera array, the camera array comprises a plurality of cameras distributed in array, and the cameras comprise lenses and image sensing units disposed in sequence. In the camera array, one or more image sensing units of the cameras may be subject to pixel distribution adjustment, to implement differential capture of view information of corresponding objects in different directions by corresponding image sensing units, and thereby a practical application requirement on diversity is met.

Optionally, as shown in FIG. 5, the imaging system comprises a light field camera, the light field camera comprises a main lens, a micro lens array and an image sensor disposed in sequence, the micro lens array comprises a plurality of lenses distributed in array, and the image sensor comprises a plurality of image sensing units distributed in array. In the light field camera, one or more image sensing units of the image sensor may be subject to pixel distribution adjusting to implement differential capture of view information of corresponding objects in different directions by corresponding image sensing units, and thereby a practical application requirement on diversity is met.

Optionally, as shown in FIG. 8, the image capture control apparatus further comprises: a direction determining module 74. The direction determining module 74 is configured to determine the first direction, and enable the pixel distribution adjusting module 71 according to a determining result. In the solution, directions of differential capture of view information are determined according to actual needs, the implementation manner is flexible and the practical application requirement on diversity is met.

Optionally, the direction determining module 74 comprises: a mode based direction determining submodule 741. The mode based direction determining submodule 1041 is configured to determine the first direction according to an image capture mode of the imaging system. In the solution, the first direction is determined in combination with the position change of the image sensing unit in different image capture modes, to cause the determination of the first direction to have more pertinence, and differential capture of view information in two different directions such as the horizontal direction and vertical direction can be acquired. Further, optionally, the mode based direction determining submodule 741 comprises: a direction determining unit 7411. The direction determining unit 7411 is configured to determine a reference direction corresponding to the image capture mode of the imaging system as the first direction according to the mapping relationship between the image capture mode and the reference direction. The solution is simple and easy to implement.

Optionally, the direction determining module 74 comprises: a scene based direction determining submodule 742.

The scene based direction determining submodule 742 is configured to determine the first direction according to an image analysis result of the scene. In the solution, an object distribution rule of the scene may be determined by an image analysis means, and is used as the basis for determining the first direction, to implement differential capture of view information in two directions such as the horizontal direction and the vertical direction.

Optionally, the image capture control apparatus further comprises: a translation control module 75. The translation control module 75 is configured to translate the image sensing unit along a respective normal line, to enlarge the effective region in which the light through the corresponding lens is imaged on the image sensing unit. By means of the solution, the maximal variable range of the ratio of the pixels distributed along the first direction and the second direction in the effective region can be accordingly increased, and thereby the flexibility of the ratio of the pixels distributed in two directions is increased, universality of the solution is increased, and the practical application requirement on diversity is met.

Figure 9:
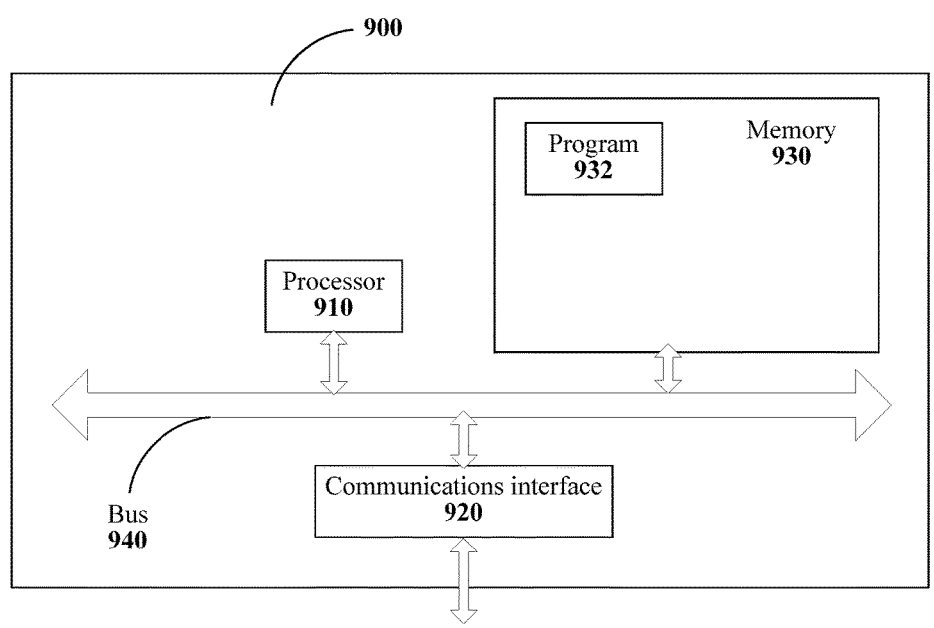
FIG. 9 is a logical block diagram of a third image capture control apparatus according to an example embodiment of the present application.

FIG. 9 is a schematic structural diagram of a third image capture control apparatus according to an embodiment of the present application, and a specific implementation manner of the image capture control apparatus 900 is not limited in this embodiment of the present application. As shown in FIG. 9, the image capture control apparatus 900 may comprise:

a processor 910, a communications interface 920, a memory 930 and a communications bus 940.

The processor 910, the communications interface 920, and the memory 930 communicate with one another by using the communications bus 940.

The communications interface 920 is configured to communicate with a deformable image sensor and the like.

The processor 910 is configured to execute a program 932, and specifically execute related steps in any method embodiment above.

For example, the program 932 may comprise a program code, and the program code comprises a computer operation instruction.

The processor 910 may be a central processing unit (CPU), or an application specific integrated circuit (ASIC) or configured to be one or more integrated circuits implementing the embodiments of the present application.

The memory 930 is configured to store the program 932. The memory 930 may comprise a random access memory (RAM), and may further comprise a non-volatile memory, such as at least one magnetic disk storage.

For example, in one example embodiment, the processor 910 can execute the following steps by executing the program 932: adjusting pixel distribution of at least one image sensing unit, to change a ratio of pixels distributed along two directions in a respective effective region of the at least one image sensing unit, wherein the effective region is a region in which light through a lens that is in an imaging system and corresponds to an image sensing unit is imaged on the image sensing unit; the two directions comprise a first direction and a second direction that are parallel with the image sensing unit and orthogonal to each other; and the image sensing unit comprises a plurality of pixels adjustable in distribution, and the plurality of pixels is used for recording multidirectional view information of a same object of a scene; and capturing an image of the scene by using the imaging system. In other example embodiments, the processor 910 can execute the steps mentioned in any other embodiment by executing the program 932, and details are not repeated herein.

For each step in the program 932, reference may be made to the corresponding description of corresponding steps, modules, submodules and units in foregoing embodiments, and details are not repeated herein. A person of ordinary skill in the art can clearly understand that for convenient and brief description, for a specific work process of the foregoing devices and modules, reference may be made to the corresponding process description in the embodiments of the methods, and details are not repeated herein.

In the foregoing embodiments of the present application, the serial number and/or sequence of the embodiments are only intended for the convenience of description, and do not represent inferiority or superiority of the embodiments. The description of each embodiment has a different focus. For any part of an embodiment not described in details, refer to relevant description of another embodiment. For relevant description of the implementation principle or process of apparatus, device or system embodiments, refer to records of relevant method embodiments. Details are not described herein again.

A person of ordinary skill in the art may recognize that, the units, methods and procedures of each example described with reference to the embodiments disclosed herein can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or a part thereof contributing to the existing art, or a part of the technical solutions may be implemented in the form of a software product. The computer software product is stored in a storage medium and comprises several instructions for instructing a computer device (which may be a personal computer, a server, a network device, or the like) to perform all or some of the steps of the image capture control methods in the embodiments of the present application. The foregoing storage medium comprises: any medium that can store program code, such as a USB flash drive, a removable hard disk, a read-only memory (ROM), a random access memory (RAM), a magnetic disk, or an optical disc.

In the apparatus, method and system embodiments of the present application, apparently, each component (such as a system, a sub-system, a module, a sub-module, a unit, and a sub-unit) or each step may be decomposed, combined and/or recombined after decomposition. Such decomposition and/or recombination shall be considered as an equivalent solution of the present application. In addition, in the above description of specific embodiments of the present application, a feature described and/or shown in one implementation manner may be used in one or more other implementation manners by using a same or similar manner, combined with a feature of another implementation manner, or replace a feature of another implementation manner.

It should be emphasized that, the term "comprise" used herein refers to existence of a feature, an element, a step or a component, but does not exclude existence or addition of one or more other features, elements, steps or components.

Finally, it should be noted that, the above implementation manners are only used to describe the present application, rather than limit the present application. Various alterations and variants may also be made by a person of ordinary skill in the art without departing from the spirit and scope of the present application. Therefore, all equivalent technical solutions also belong to the scope of the present application, and the patent protection scope of the present application should be subject to the claims.

What is claimed is:

1. A method, comprising:
adjusting, by a system comprising a processor, a pixel distribution of at least one image sensing unit, to change a ratio of pixels distributed along two directions in an effective region of the at least one image sensing unit such that the pixels distributed along the two directions in the effective region of the at least one image sensing unit are different in interval, wherein the effective region is a region in which light through a lens that is in an imaging system and corresponds to an image sensing unit of the at least one image sensing unit is imaged on the image sensing unit, the two directions comprise a first direction and a second direction that are parallel with the image sensing unit and orthogonal to each other, the image sensing unit comprises a plurality of pixels adjustable in distribution, and the plurality of pixels is used for recording multidirectional view information of a same object of a scene; and
capturing an image of the scene by using the imaging system.

2. The method of claim 1, wherein the imaging system comprises a light field camera, the light field camera comprises a main lens, a micro lens array and an image sensor disposed in sequence, the micro lens array comprises a plurality of lenses distributed in array, and the image sensor comprises a plurality of image sensing units distributed in array.

3. The method of claim 1, wherein the imaging system comprises a camera array, the camera array comprises a plurality of cameras distributed in array, and the cameras comprise lenses and image sensing units disposed in sequence.

4. The method of claim 1, wherein the first direction is a horizontal direction parallel with the image sensing unit.

5. The method of claim 1, wherein the adjusting pixel distribution of at least one image sensing unit, to change a ratio of pixels distributed along two directions in a respective effective region of the at least one image sensing unit comprises:
controlling the at least one image sensing unit to be deformed, to increase a quantity of pixels distributed along the first direction and/or reduce a quantity of pixels distributed along the second direction in the effective region of the at least one image sensing unit.

6. The method of claim 1, further comprising:
before the capturing an image of the scene by using the imaging system, rotating, by the system, the at least one image sensing unit around a respective normal line, to increase the quantity of the pixels distributed along the first direction of the at least one image sensing unit.

7. The method of claim 1, further comprising:
before the capturing an image of the scene by using the imaging system, translating, by the system, the image sensing unit along a respective normal line, to enlarge the effective region in which the light through the corresponding lens is imaged on the image sensing unit.

8. The method of claim 1, further comprising: before the adjusting pixel distribution of at least one image sensing unit, determining, by the system, the first direction.

9. The method of claim 8, wherein the determining the first direction comprises:
determining the first direction according to an image capture mode of the imaging system.

10. The method of claim 9, wherein the determining the first direction according to an image capture mode of the imaging system comprises:
determining a reference direction corresponding to the image capture mode of the imaging system as the first direction according to a mapping relationship between the image capture mode and the reference direction.

11. The method of claim 8, wherein the determining the first direction comprises:
determining the first direction according to an image analysis result of the scene.

12. An apparatus, comprising:
a memory that stores executable modules; and
a processor, coupled to the memory, that executes or facilitates execution of the executable modules, the executable modules comprising:
a pixel distribution adjusting module configured to adjust pixel distribution of an image sensing unit, to change a ratio of pixels distributed along two directions in an effective region of the image sensing unit such that the pixels distributed along the two directions in the effective region of the image sensing unit are different in interval, wherein the effective region is a region in which light, through a lens that is in an imaging system and corresponds to the image sensing unit, is imaged on the image sensing unit, wherein the two directions comprise a first direction and a second direction that are parallel with the image sensing unit and orthogonal to each other, wherein the image sensing unit comprises pixels adjustable in distribution, and the pixels are used for recording multidirectional view information of a same object of a scene; and
an image capture module configured to capture an image of the scene by using the imaging system.

13. The apparatus of claim 12, wherein the imaging system comprises a light field camera, the light field camera comprises a main lens, a micro lens array and an image sensor disposed in sequence, the micro lens array comprises lenses distributed in array, and the image sensor comprises image sensing units, comprising the image sensing unit, distributed in array.

14. The apparatus of claim 12, wherein the imaging system comprises a camera array, the camera array comprises cameras distributed in array, and the cameras comprise lenses and image sensing units, comprising the image sensing unit, disposed in sequence.

15. The apparatus of claim 12, wherein the first direction is a horizontal direction parallel with the image sensing unit.

16. The apparatus of claim 12, wherein the pixel distribution adjusting module comprises:
a pixel distribution adjusting submodule configured to control the image sensing unit to be deformed, to increase a first quantity of pixels distributed along the first direction or reduce a second quantity of pixels distributed along the second direction in the effective region of the at least one image sensing unit.

17. The apparatus of claim 12, wherein the executable modules further comprise:
a rotation control module configured to rotate the image sensing unit around a respective normal line, to increase the quantity of the pixels distributed along the first direction of the image sensing unit.

18. The apparatus of claim 12, wherein the executable modules further comprise:
a translation control module configured to translate the image sensing unit along a respective normal line, to enlarge the effective region in which the light through the corresponding lens is imaged on the image sensing unit.

19. The apparatus of claim 12, wherein the executable modules further comprise:
a direction determining module configured to determine the first direction and enable the inclination control module according to a determining result of the direction determining module.

20. The apparatus of claim 19, wherein the direction determining module comprises:
a mode based direction determining submodule configured to determine the first direction according to an image capture mode of the imaging system.

21. The apparatus of claim 20, wherein the mode based direction determining submodule comprises:
a direction determining unit configured to determine a reference direction corresponding to the image capture mode of the imaging system as the first direction according to a mapping relationship between the image capture mode and the reference direction.

22. The apparatus of claim 19, wherein the direction determining module comprises:
a scene based direction determining submodule configured to determine the first direction according to an image analysis result of the scene.

23. A computer readable storage apparatus, comprising at least one executable instruction, which, in response to execution, causes a system comprising a processor to perform operations, comprising:
adjusting a pixel distribution of at least one image sensing unit, to change a ratio of pixels distributed along two directions in a respective effective region of an image sensing unit of the at least one image sensing unit such that the pixels distributed along the two directions in the effective region of the at least one image sensing unit are different in interval, wherein the respective effective region is a region in which light, through a lens that is in an imaging system and corresponds to the image sensing unit, is imaged on the image sensing unit, the two directions comprise a first direction and a second direction that are parallel with the image sensing unit and orthogonal to each other, the image sensing unit comprises a plurality of pixels adjustable in distribution, and the plurality of pixels is used for recording multidirectional view information of a same object of a scene; and
capturing an image of the scene by using the imaging system.

24. An apparatus, characterized by comprising a processor and a memory, the memory storing executable instructions, the processor being connected to the memory through a communication bus, and when the apparatus operates, the processor executing the executable instructions stored in the memory, so that the apparatus executes operations, comprising:

adjusting a distribution of pixels of at least one image sensing unit, to change a ratio of the pixels distributed along two directions in an effective region of the at least one image sensing unit such that the pixels distributed along the two directions in the effective region of the at least one image sensing unit are different in interval, wherein the effective region is a region in which light, through a lens that is in an imaging system and corresponds to an image sensing unit of the at least one image sensing unit, is imaged on the image sensing unit, wherein the two directions comprise a first direction and a second direction that are parallel with the image sensing unit and orthogonal to each other, and wherein the pixels are used for recording multidirectional view information of a same object of a scene; and
capturing an image of the scene by using the imaging system.

* * * * *